(12) United States Patent
Gong et al.

(10) Patent No.: US 8,462,515 B2
(45) Date of Patent: Jun. 11, 2013

(54) ELECTRONIC DEVICE WITH SLIDE-IN CIRCUIT BOARD

(75) Inventors: Xin-Hu Gong, Shenzhen (CN); Si-Wen Shu, Shenzhen (CN); Gao-Liang Xia, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 110 days.

(21) Appl. No.: 13/236,604

(22) Filed: Sep. 19, 2011

(65) Prior Publication Data

US 2012/0262893 A1    Oct. 18, 2012

(30) Foreign Application Priority Data

Apr. 15, 2011    (CN) .......................... 2011 1 0094651

(51) Int. Cl.
*H05K 1/00*    (2006.01)

(52) U.S. Cl.
USPC .......... 361/756; 361/752; 361/757; 361/759; 361/748

(58) Field of Classification Search
USPC .......................... 361/756, 752, 757, 759, 748
See application file for complete search history.

*Primary Examiner* — Timothy Thompson
*Assistant Examiner* — Andargie M Aychillhum
(74) *Attorney, Agent, or Firm* — Altis Law Group, Inc.

(57) ABSTRACT

An exemplary electronic includes a casing and a circuit board. The casing includes a bottom plate and two side plates extending upward from two opposite sides of the bottom plate, respectively. Hooks are formed on the bottom plate. Two guiding members are located at the side plates, respectively. The circuit board defines engaging slots corresponding to the hooks of the bottom plate, respectively. During assembly of the circuit board to the casing, the circuit board is inserted into the casing and slides between the side plates with two opposite lateral sides thereof sliding along the guiding members, until the hooks of the bottom plate are received in the engaging slots of the circuit board and the circuit board is thereby secured in the casing.

18 Claims, 6 Drawing Sheets

ELECTRONIC DEVICE WITH SLIDE-IN CIRCUIT BOARD

BACKGROUND

1. Technical Field

The disclosure generally relates to computer and electronic communication equipment, and more particularly to electronic devices that include a casing and a circuit board such as a printed circuit board.

2. Description of the Related Art

Computer and communication equipment, such as personal computers, servers, storages, and workstations usually include a casing and a printed circuit board received in the casing. A plurality of through holes is defined in one side of the casing. The printed circuit board has threaded holes corresponding to the through holes of the casing. When the equipment is assembled, fasteners are extended through the through holes of the casing and threadedly engaged in the threaded holes of the printed circuit board, thereby attaching the printed circuit board to the casing. However, assembly and detachment of the printed circuit board require a tool, such as a screwdriver, rendering the processes somewhat cumbersome and time-consuming.

What is called for, then, is an electronic device which can overcome the limitations described.

DETAILED DESCRIPTION

Reference will now be made to the figures to describe the present electronic device in detail.

Figure 1:
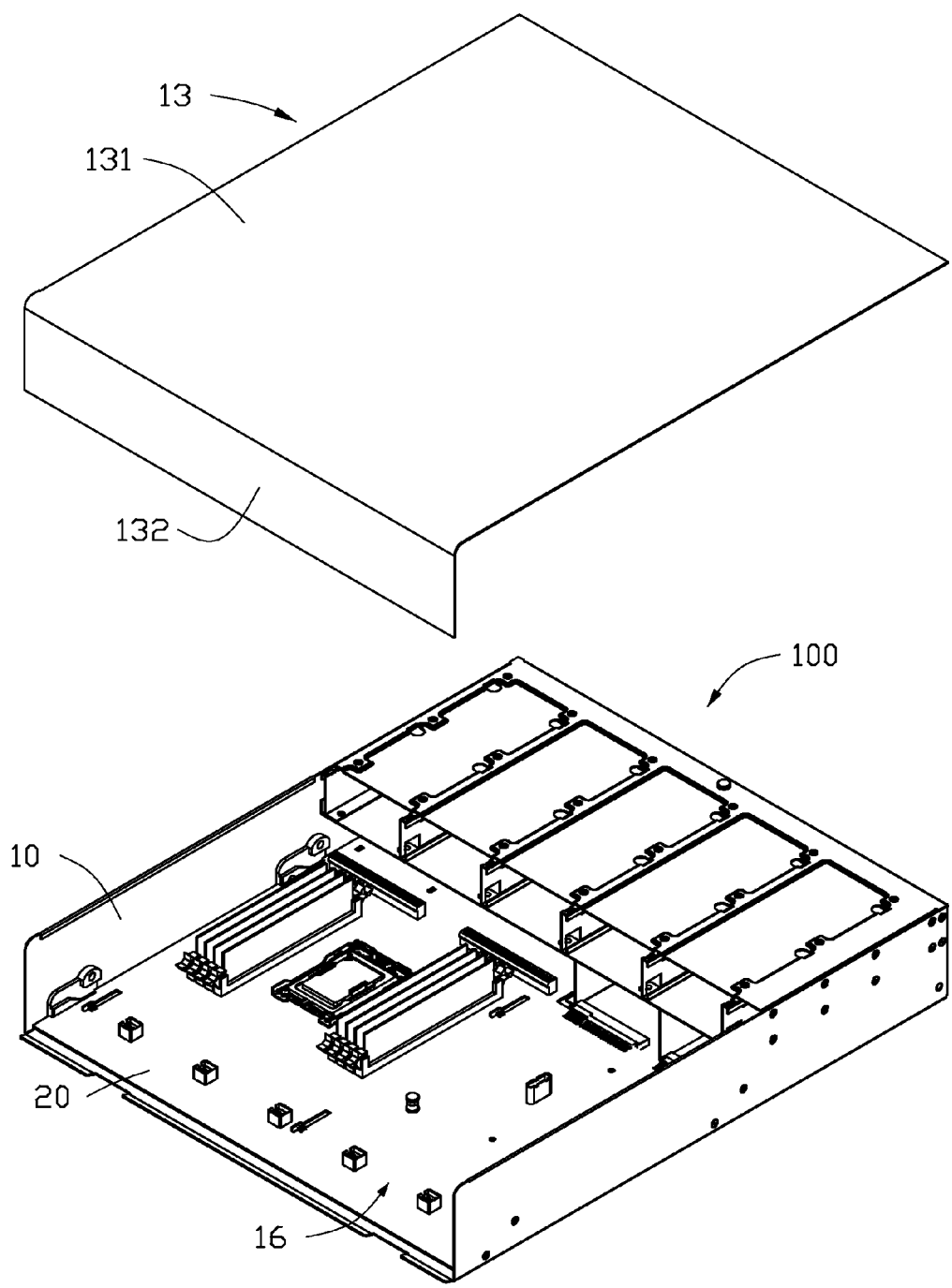
FIG. 1 is an isometric, exploded view of an electronic device according to an exemplary embodiment of the present disclosure.
Figure 2:
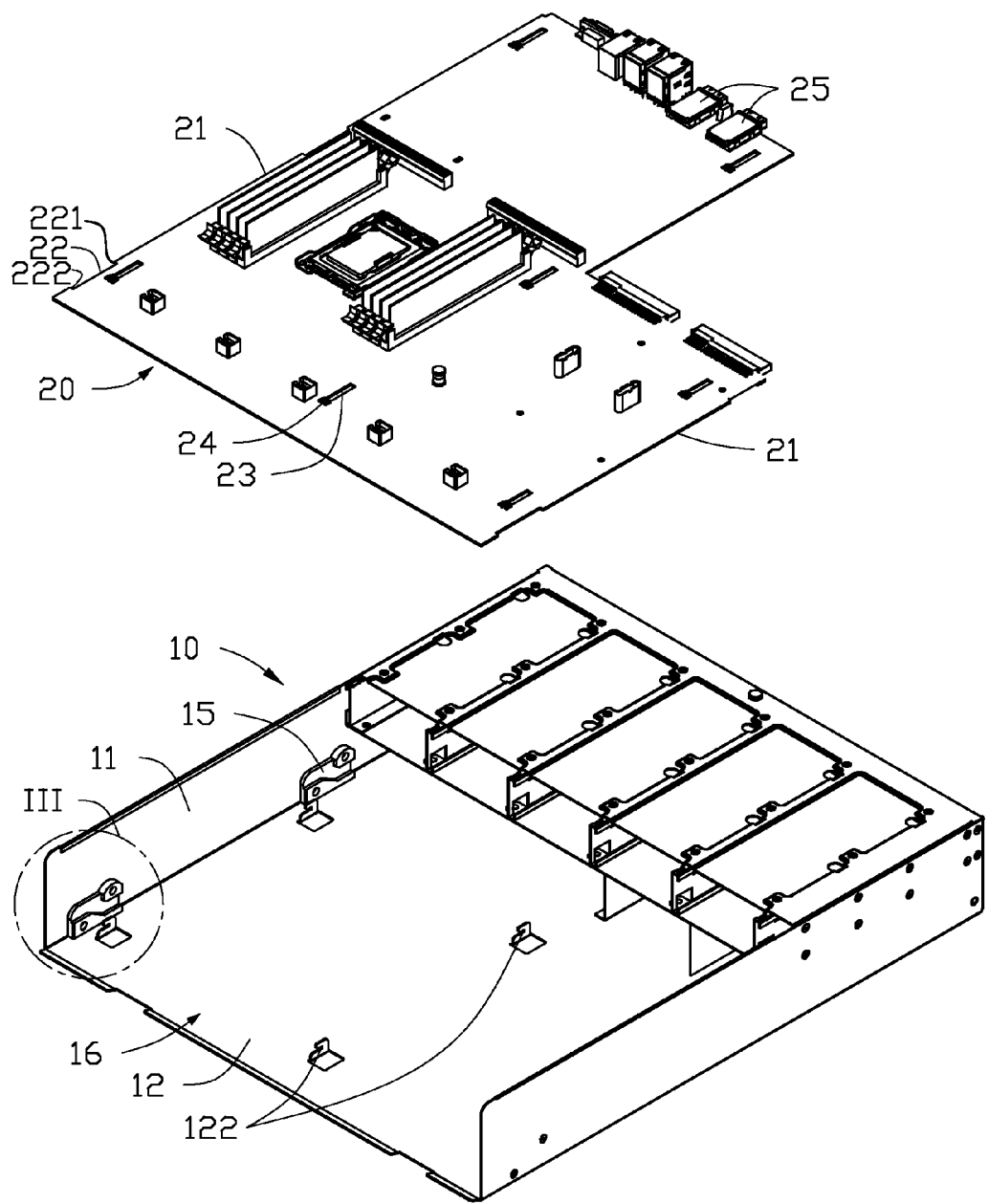
FIG. 2 is similar to FIG. 1, but showing the casing further exploded, and omitting a top plate of the casing.

Referring to FIGS. 1 and 2, an electronic device 100 according to an exemplary embodiment of the present disclosure includes a casing 10 and a printed circuit board 20.

The casing 10 includes a top plate 13, a bottom plate 12 spaced from the top plate 13, and two side plates 11 connected between two opposite sides of the top plate 13 and the bottom plate 12, respectively. The top plate 13 includes a substantially rectangular main plate 131, and a cover plate 132 depending from a front side of the main plate 131. The bottom plate 12 is similar to the main plate 131 of the top plate 13. An opening 16 is defined between front ends of the side plates 11. The opening 16 is configured for allowing the printed circuit board 20 to be inserted into the casing 10.

Figure 3:
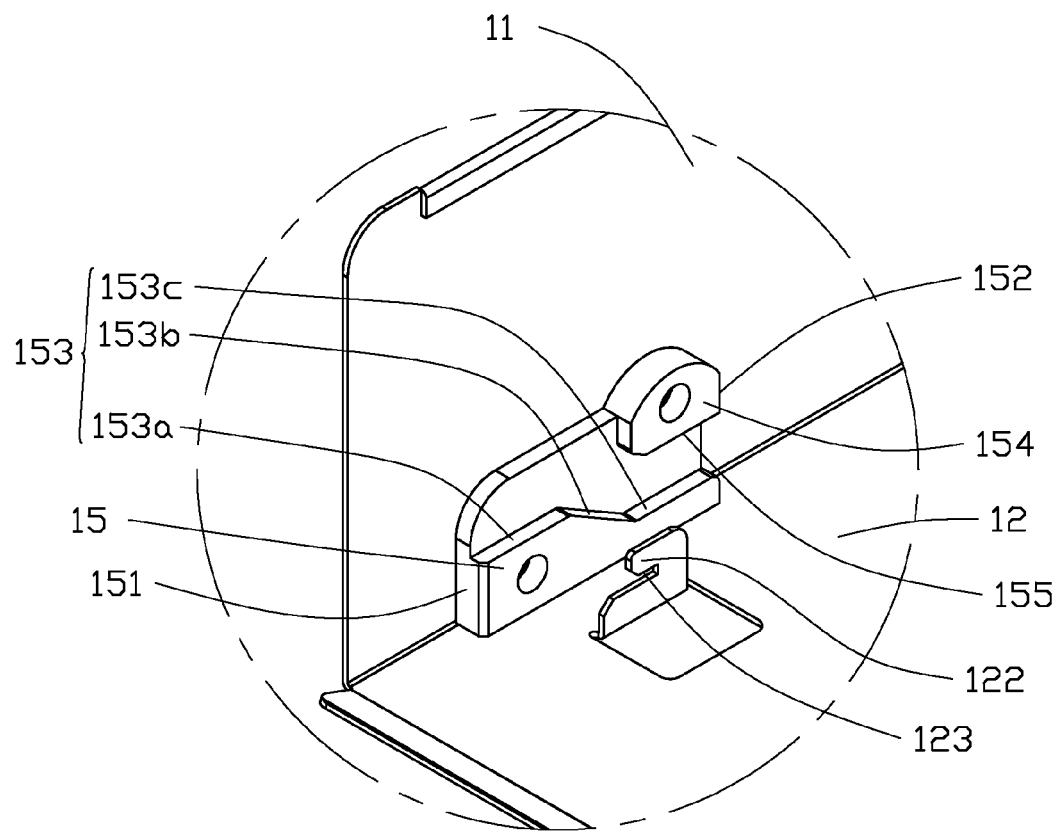
FIG. 3 is an enlarged view of a circled portion III of FIG. 2.

The side plates 11 are parallel to each other, and perpendicular to the bottom plate 12. Referring also to FIG. 3, each of the side plates 11 forms a plurality of guiding members 15 on an inner surface thereof which faces the other side plate 11. The guiding members 15 on both side plates 11 are level with each other. That is, a distance between each of the guiding members 15 and the bottom plate 12 is substantially the same. The guiding members 15 of each of the side plates 11 are aligned with the guiding members 15 of the other side plate 11, respectively.

Each of the guiding members 15 includes a front end surface 151 nearer to the opening 16, a rear end surface 152 far away from the opening 16, and a guiding surface 153 interconnecting the front end surface 151 and the rear end surface 152. Each of the front end surface 151 and the rear end surface 152 is perpendicular to the inner surface of the corresponding side plate 11, and extends vertically along a height direction of the corresponding side plate 11. The guiding surface 153 is perpendicular to the inner surface of the corresponding side plate 11, and extends generally along a lengthwise direction of the corresponding side plate 11. The guiding surface 153 faces toward the top plate 13 of the casing 10.

The guiding surface 153 includes a first horizontal portion 153a, a second horizontal portion 153c spaced from the first horizontal portion 153a and lower than the first horizontal portion 153a, and an inclined portion 153b interconnecting the first horizontal portion 153a and the second horizontal portion 153c. The first horizontal portion 153a, the inclined portion 153b and the second horizontal portion 153c are arranged in that sequence in a direction from adjacent to the opening 16 to far away from the opening 16. Each of the first horizontal portion 153a and the second horizontal portion 153c is parallel to the bottom plate 12. A distance between the first horizontal portion 153a and the bottom plate 12 is larger than a distance between the second horizontal portion 153c and the bottom plate 12.

Each of the guiding members 15 also includes a protruding tab 154 located right above the second horizontal portion 153c of the guiding surface 153. The protruding tab 154 includes a planar bottom surface 155 facing and parallel to the second horizontal portion 153c of the guiding surface 153. The planar bottom surface 155 is also parallel to the first horizontal portion 153a. A vertical distance between a plane defined by the bottom surface 155 of the protruding tab 154 and a plane defined by the first horizontal portion 153a of the guiding surface 153 is substantially equal to, or preferably slightly larger than, a thickness of the printed circuit board 20. The bottom plate 12 forms a plurality of hooks 122 arranged in a matrix. Each of the hooks 122 is generally U-shaped, and defines an engaging groove 123 facing the opening 16 of the casing 10.

Referring back to FIG. 2, the printed circuit board 20 includes two lateral sides 21, which are parallel to and spaced a short distance from the two side plates 11 of the casing 10, respectively. A distance between the two lateral sides 11 (i.e. a width of the printed circuit board 20) is substantially equal to a distance between each two aligned guiding members 15. A plurality of cutouts 22 corresponding to the guiding members 15 is defined in the lateral sides 11 of the printed circuit board 20. Each of the cutouts 22 is rectangular, and is bounded by a front contacting surface 222 substantially aligned with the front end surface 151 of a corresponding guiding member 15, and a rear contacting surface 221 parallel to the front end surface 151. A distance between the front contacting surface 222 and the rear contacting surface 221 of each of the cutouts 22 is smaller than a distance between the front end surface 151 and the rear end surface 152 of the corresponding guiding member 15.

Figure 4:
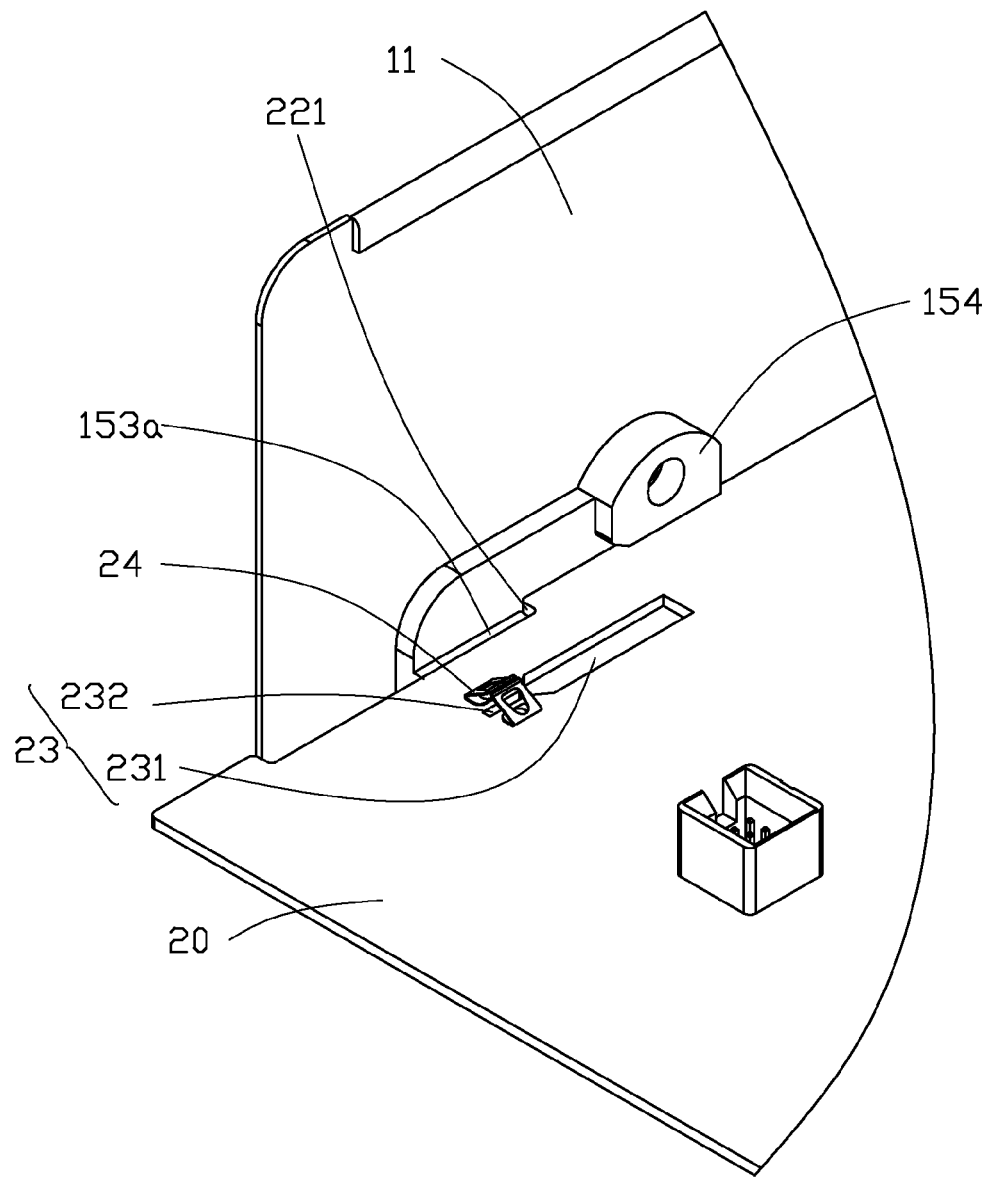
FIGS. 4-6 are similar to FIG. 3, but show successive stages in a process of assembling a printed circuit board of the electronic device into the casing.

Referring also to FIG. 4, the printed circuit board 20 defines a plurality of engaging slots 23 therein. The engaging slots 23 correspond to the hooks 122 of the bottom plate 12, respectively. Each of the engaging slots 23 includes a first slot 231 adjacent to the opening 16, and a second slot 232 far away from the opening 16. The first slot 231 has a width substantially equal to a thickness of the corresponding hook 122 of the bottom plate 12, and the width of the first slot 231 is smaller than that of the second slot 232. Referring also to FIG.

5, two clasping fingers 24 are located at two opposite sides of the first slot 231 of each of the engaging slots 23, respectively. Each of the clasping fingers 24 extends upward and slantwise from a position of the printed circuit board 20 that is adjacent to the first slot 231 of the corresponding engaging slot 23, towards the other clasping finger 24. Thereby, top ends of the two clasping fingers 24 contact each other. Alternatively, the top ends of the two clasping fingers 24 can be spaced from each other, with a distance defined therebetween smaller than the thickness of the corresponding hook 122 of the bottom plate 12. A plurality of input/output (I/O) interfaces 25 is mounted on a rear side of the printed circuit board 20. The I/O interfaces 25 are configured for connecting external I/O devices (not shown) according to user requirements.

Figure 5:
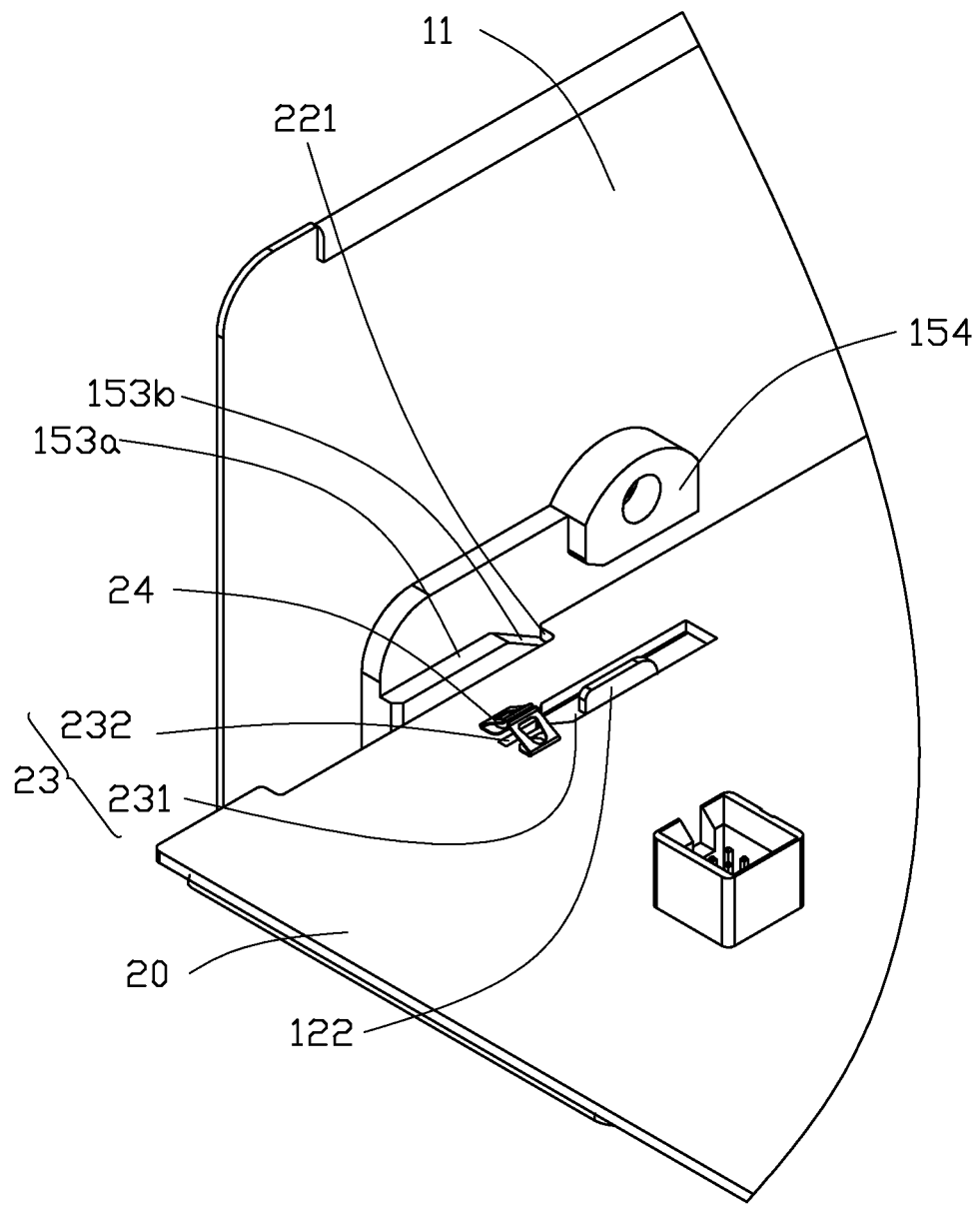
Figure 6:
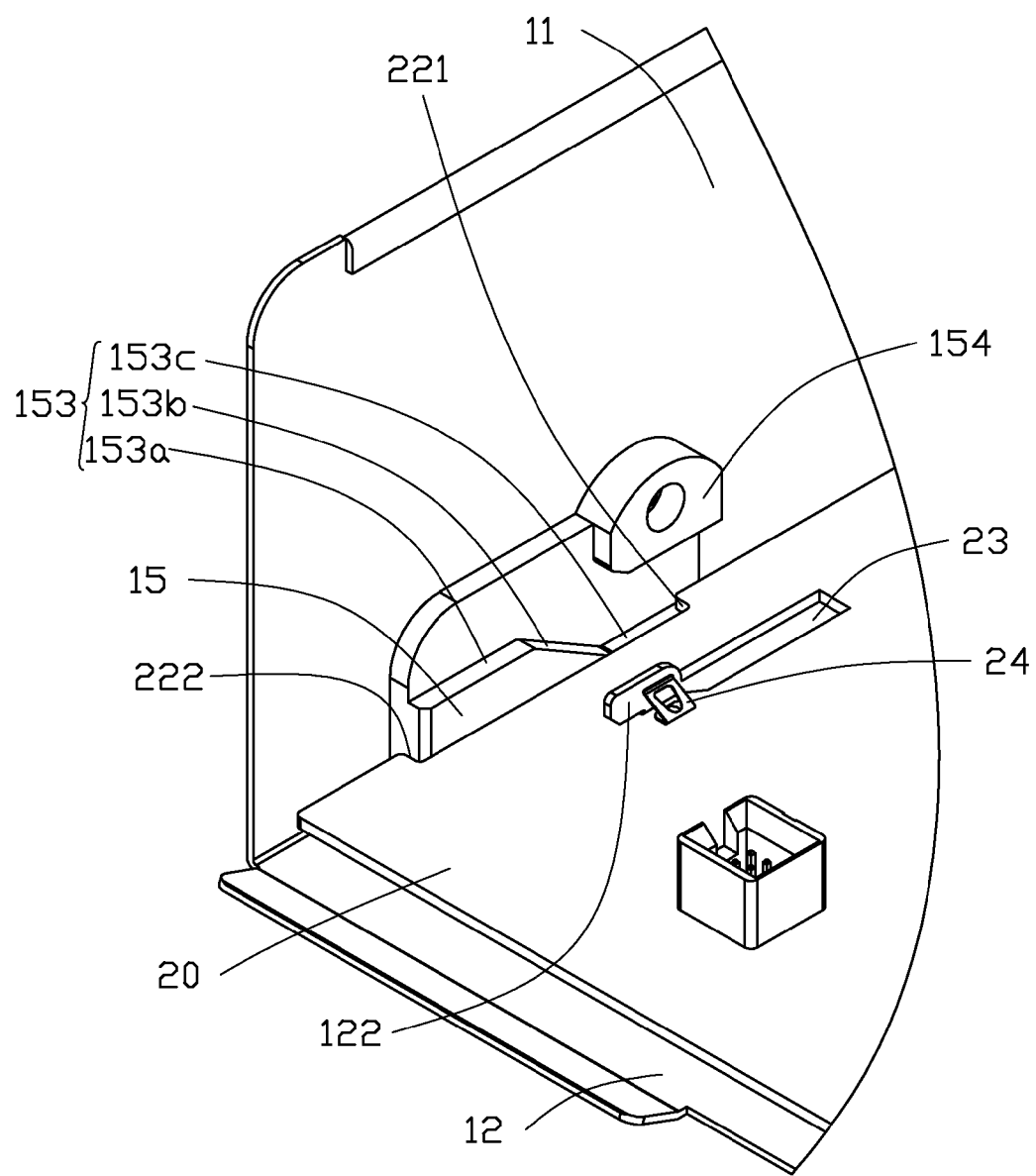

Referring to FIGS. 4-6, details of assembly of the printed circuit board 20 into the casing 10 are as follows. The printed circuit board 20 is positioned in front of the opening 16 of the casing 10, with the two lateral sides 21 aligned with the two side plates 11 of the casing 10, respectively. The printed circuit board 20 is inserted into the casing 10 via the opening 16, with a bottom surface thereof level with the first horizontal portions 153a of the guiding surfaces 153 of the guiding members 15. Referring to FIG. 4, the printed circuit board 20 is pushed rearward with the bottom surface thereof contacting and sliding along the first horizontal portions 153a of the guiding members 15. In this state, the printed circuit board 20 is supported by the first horizontal portions 153a of the guiding members 15. A distance between the printed circuit board 20 and the bottom plate 12 of the casing 10 is equal to the distance between each of the first horizontal portions 153a and the bottom plate 12.

Referring to FIG. 5, the printed circuit board 20 is further pushed rearward until the rear contacting surfaces 221 of the cutouts 22 slide over the first horizontal portions 153a of the guiding surfaces 153 of the protruding members 15 and slide onto the inclined portions 153b. Then the printed circuit board 20 moves rearward via the rear contacting surfaces 221 sliding along the inclined portions 153b of the guiding members 15 towards the second horizontal portions 153c. During this process, the printed circuit board 20 is supported by the inclined portions 153b of the guiding members 15. The distance between the printed circuit board 20 and the bottom plate 12 gradually decreases as the rear contacting surfaces 221 slide from ends of the inclined portions 153b which connect the first horizontal portions 153a to ends of the inclined portions 153b which connect the second horizontal portions 153c. The hooks 122 of the bottom plate 12 respectively traverse through the second slots 232 of the engaging slots 23 of the printed circuit board 20 to gradually protrude out above the printed circuit board 20.

When the rear contacting surfaces 221 of the cutouts 22 slide over the inclined portions 153b of the guiding members 15 and slide onto the second horizontal portions 153c of the guiding members 15, the bottom surface of the printed circuit board 20 contacts the second horizontal portions 153c of the guiding members 15. In this state, the printed circuit board 20 is supported by the second horizontal portions 153c of the guiding members 15, and the distance between the printed circuit board 20 and the bottom plate 12 is equal to the distance between the second horizontal portions 153c of the guiding surfaces 153 of the guiding members 15 and the bottom plate 12.

The printed circuit board 20 is further pushed rearward to slide along the second horizontal portions 153c, until the front contacting surfaces 222 of the cutouts 22 abut against the front end surfaces 151 of the guiding members 15, respectively. In this state, the hooks 122 are located in the first slots 231 of the engaging slots 23, respectively. Each of the hooks 122 is sandwiched between two corresponding clasping fingers 24 of the corresponding engaging slot 23, for keeping the printed circuit board 20 stably in position. In a typical embodiment, the two clasping fingers 24 elastically press the hook 122 therebetween. Thus, the assembly of the printed circuit board 20 and the casing 10 is finished.

Detachment of the printed circuit board 20 from the casing 10 requires that the printed circuit board 20 be pulled forward to disengage the hooks 122 from the clasping fingers 24 and from the first slots 231 of the engaging slots 23 of the printed circuit board 20, respectively. The printed circuit board 20 is further pulled forward along the guiding surfaces 153 of the guiding members 15, until the printed circuit board 20 is completely withdrawn from the casing 10.

Thus, the printed circuit board 20 can be easily assembled to or detached from the casing 10 without any tools, which makes the assembly and disassembly of the electronic device 100 simple and convenient.

It is to be further understood that even though numerous characteristics and advantages have been set forth in the foregoing description of embodiments, together with details of the structures and functions of the embodiments, the disclosure is illustrative only; and that changes may be made in detail, especially in matters of shape, size, and arrangement of parts within the principles of the disclosure to the full extent indicated by the broad general meaning of the terms in which the appended claims are expressed.

What is claimed is:

1. An electronic device, comprising:
a casing comprising a bottom plate, a top plate spaced from the bottom plate and two side plates connected between two opposite sides of the bottom plate and the top plate, an opening defined between front ends of the two side plates, a plurality of hooks formed on the bottom plate, a plurality of guiding members located on inner faces of each of the side plates; and
a circuit board defining a plurality of engaging slots corresponding to the hooks of the bottom plate, respectively;
wherein, during assembly of the circuit board into the casing, the circuit board is inserted into the casing via the opening and slides between the side plates, with two opposite lateral sides of the circuit board sliding along the guiding members until the hooks of the bottom plate are received in the engaging slots of the circuit board and the circuit board is thereby secured in the casing,
wherein each of the guiding members comprises a guiding surface perpendicular to the corresponding side plate, the guiding surface comprising a first horizontal portion nearer to the opening, a second horizontal portion lower than the first horizontal portion and farther from the opening, and an inclined portion connected between the first horizontal portion and the second horizontal portion.

2. The electronic device of claim 1, wherein the first horizontal portion and the second horizontal portion of each of the guiding members are parallel to the bottom plate, a distance between the first horizontal portion and the bottom plate being larger than a distance between the second horizontal portion and the bottom plate.

3. The electronic device of claim 1, wherein each of the guiding members further comprises a front end surface nearer to the opening and a rear end surface far away from the opening, the guiding surface connected between the front end surface and the rear end surface, each of the front end surface and the rear end surface being perpendicular to the corresponding side plate and extended along a height direction of the corresponding side plate.

4. The electronic device of claim 1, wherein each of the guiding members further comprises a protruding tab located above the guiding surface, the protruding tab comprising a bottom surface substantially parallel to both the first horizontal portion and the second horizontal portion of the guiding surface, and a vertical distance between a plane defined by the bottom surface of the protruding tab and a plane defined by the first horizontal portion being substantially equal to a thickness of the circuit board.

5. The electronic device of claim 1, wherein each of the engaging slots comprises a first slot and a second slot rearward of and communicated with the first slot, the first slot has a width substantially equal to a thickness of the corresponding hook, and the second slot is wider than the first slot.

6. The electronic device of claim 5, wherein two clasping fingers are formed at two opposite sides of the first slot of each of the engaging slots, respectively, each of the hooks being sandwiched between two corresponding clasping fingers when the circuit board is secured in the casing.

7. The electronic device of claim 6, wherein each of the two clasping fingers extends upward and slantwise from a position of the circuit board which is adjacent to the first slot of the engaging slot towards the other clasping finger, with top ends of the two clasping fingers abutting each other before the corresponding hook is sandwiched therebetween.

8. The electronic device of claim 1, wherein the circuit board defines a plurality of cutouts at each of the two opposite lateral sides thereof, the cutouts corresponding to the guiding members of the casing, respectively.

9. The electronic device of claim 8, wherein each of the cutouts is shorter than the corresponding guiding member.

10. The electronic device of claim 9, wherein a front wall of each of the cutouts abuts a front end of the corresponding guiding member when the circuit board is secured in the casing.

11. An electronic device, comprising:
a casing comprising a bottom plate and two side plates extending upward from two opposite sides of the bottom plate, respectively, a plurality of hooks formed on the bottom plate, two guiding members located at inner faces of the side plates, respectively; and
a circuit board defining a plurality of engaging slots corresponding to the hooks of the bottom plate, respectively;
wherein, during assembly of the circuit board to the casing, the circuit board is inserted into the casing and slides between the side plates with two opposite lateral sides of the circuit board sliding along the guiding members, until the hooks of the bottom plate are received in the engaging slots of the circuit board and the circuit board is thereby secured in the casing,
wherein each of the guiding members comprises a guiding surface perpendicular to the corresponding side plate, the guiding surface comprising a first horizontal portion nearer to the opening, a second horizontal portion lower than the first horizontal portion and farther from the opening, and an inclined portion connected between the first horizontal portion and the second horizontal portion.

12. The electronic device of claim 11, wherein the first horizontal portion and the second horizontal portion of each of the guiding members are parallel to the bottom plate, a distance between the first horizontal portion and the bottom plate being larger than a distance between the second horizontal portion and the bottom plate.

13. The electronic device of claim 11, wherein an opening is defined between one ends of the side plates, each of the guiding members comprising a front end surface adjacent to the opening and a rear end surface far away from the opening, the guiding surface connected between the front end surface and the rear end surface, each of the front end surface and the rear end surface being perpendicular to the corresponding side plate and extended along a height direction of the corresponding side plate.

14. The electronic device of claim 11, wherein each of the guiding members further comprises a protruding tab located above the guiding surface, the protruding tab comprising a bottom surface substantially parallel to both the first horizontal portion and the second horizontal portion of the guiding surface, and a vertical distance between a plane defined by the bottom surface of the protruding tab and a plane defined by the first horizontal portion being substantially equal to a thickness of the circuit board.

15. The electronic device of claim 11, wherein each of the engaging slots comprises a first slot and a second slot rearward of and communicated with the first slot, the first slot has a width substantially equal to a thickness of the corresponding hook, and the second slot is wider than the first slot.

16. The electronic device of claim 15, wherein two clasping fingers are formed at two opposite sides of the first slot of each of the engaging slots, respectively, each of the hooks being sandwiched between two corresponding clasping fingers when the circuit board is secured in the casing.

17. The electronic device of claim 16, wherein each of the two clasping fingers extends upward and slantwise from a position of the circuit board which is adjacent to the first slot of the engaging slot towards the other clasping finger, with top ends of the two clasping fingers abutting each other before the corresponding hook is sandwiched therebetween.

18. The electronic device of claim 11, wherein the circuit board defines a plurality of cutouts at each of the two opposite lateral sides thereof, the cutouts corresponding to the guiding members of the casing, respectively, each of the cutouts is shorter than the corresponding guiding members.

\* \* \* \* \*